United States Patent
Yoshikawa et al.

(10) Patent No.: US 8,716,622 B2
(45) Date of Patent: May 6, 2014

(54) APPARATUS AND METHOD FOR PERFORMING LASER WELDING OPERATIONS

(75) Inventors: Nobuhiro Yoshikawa, Kawasaki (JP); Gakushi Komatsu, Yokohama (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 1490 days.

(21) Appl. No.: 11/726,503

(22) Filed: Mar. 22, 2007

(65) Prior Publication Data

US 2007/0221638 A1 Sep. 27, 2007

(30) Foreign Application Priority Data

Mar. 23, 2006 (JP) .................................. 2006-081560
Feb. 1, 2007 (JP) .................................. 2007-023309

(51) Int. Cl.
*B23K 26/00* (2006.01)
(52) U.S. Cl.
USPC ............. 219/121.63; 219/121.61; 219/121.64
(58) Field of Classification Search
USPC ............... 219/121.6, 121.61, 121.63, 121.64, 219/121.67, 121.78, 121.82
See application file for complete search history.

(56) References Cited

U.S. PATENT DOCUMENTS

2004/0107026 A1* 6/2004 Kroth ............................ 700/304
2005/0150876 A1   7/2005 Menin et al.

FOREIGN PATENT DOCUMENTS

| CN | 1628928 A | 6/2005 | |
|---|---|---|---|
| EP | 1 288 835 A1 | 8/2002 | |
| EP | 1 600 244 A1 | 11/2005 | |
| JP | 62-024886 A | 2/1987 | |
| JP | 2005-177862 | 7/2005 | |
| KR | 10-2005-0062394 | 6/2005 | |
| WO | WO 2006015795 A1 * | 2/2006 | ............. B23K 26/02 |

* cited by examiner

*Primary Examiner* — Dana Ross
*Assistant Examiner* — John Wasaff
(74) *Attorney, Agent, or Firm* — Drinker Biddle & Reath LLP

(57) ABSTRACT

A laser welding apparatus and method reproduces a welding state substantially identical to an actual operation of a robot at a manufacturing site even when an operating speed of the robot is changed. When a moving speed of the robot is, for example, 50% of an override ratio, a welding point speed, which is a resultant speed of a focus moving speed of the laser beam by movement of the robot having a scanner head and the focus moving speed of the laser beam by rotation of the laser scanning mirror, becomes identical to that when an override ratio is 100%. This is achieved by increasing a rotating speed of a laser scanning mirror within the scanner head.

21 Claims, 5 Drawing Sheets

US 8,716,622 B2

APPARATUS AND METHOD FOR PERFORMING LASER WELDING OPERATIONS

CROSS-REFERENCE TO RELATED APPLICATION

This application claims priority of Japanese Patent Application Nos. 2006-081560, filed Mar. 23, 2006, and 2007-023309, filed Feb. 1, 2007, each of which is incorporated herein in its entirety by reference.

TECHNICAL FIELD

The present invention relates to an apparatus and method for performing laser welding operations.

BACKGROUND

Laser welding is currently used to carry out robotic welding. Japanese Laid-Open Patent Publication No. 2005-177862 discloses an example of such a welding technique, wherein a laser irradiating device is installed at a tip of a robotic arm (i.e., a manipulator) for irradiating a laser beam. The robotic arm is moved while changing an irradiating direction of the laser beam emitted from the laser irradiating device such that a predetermined welding point is welded by moving the laser beam. Such type of welding is referred to as remote welding since an object to be welded (work piece) is spaced apart from the laser irradiating device.

In such remote welding, a moving speed of the laser irradiating device at the tip of the robotic arm is acquired at a test-run for instructing a motion path of the robot during preparation.

SUMMARY OF THE INVENTION

An apparatus and method for performing laser welding operations is disclosed herein. One example of a laser welding apparatus for performing welding by irradiating a laser beam comprises a laser oscillator operable to generate a laser beam, a laser irradiating device having a reflecting device configured to change an irradiating direction of the laser beam guided from the laser oscillator, a moving device operable to move the laser irradiating device and a control unit. The control unit is operable to control the reflecting device such that when an operating speed of the moving device is changed, a resultant speed of a focus moving speed of the laser beam by movement of the laser irradiating device and a focus moving speed of the laser beam by movement of the reflecting device is equal to a predetermined value.

According to another example of such a laser welding apparatus, the apparatus comprises a laser oscillator operable to generate a laser beam, a laser irradiating device having a reflecting device configured to change an irradiating direction of the laser beam guided from the laser oscillator, a moving device operable to move the laser irradiating device and a control unit. The control unit is operable to control the reflecting device such that when an operating speed of the moving device is changed, a moving speed of a laser focus based on movement of the laser irradiating device and of the reflecting device is equal to a predetermined value.

Another apparatus for laser welding taught herein comprises a laser oscillator for generating a laser beam, a laser irradiating device having a directing device to direct the laser beam at a weld point at a first welding speed, a moving device operable to move the laser irradiating device, the moving device operable to move the weld point at a second welding speed, and a control unit. The control unit is operable to selectively move at least one of the directing device and the head moving device to maintain a resultant speed of the first welding speed and the second welding speed equal to a predetermined value.

Methods of method of performing laser welding using a laser irradiating device having a reflecting mirror movable to change an irradiating direction of a laser beam are also taught herein. One such method comprises generating a laser beam, moving the laser irradiating device at an operating speed other than a programmed operating speed and controlling the reflecting mirror such that a resultant speed of a focus moving speed of the laser beam by movement of the laser irradiating device and a focus moving speed of the laser beam by movement of the reflecting mirror is equal to a predetermined resultant speed when the laser irradiating device is operated at the programmed operating speed.

BRIEF DESCRIPTION OF THE DRAWINGS

The description herein makes reference to the accompanying drawings wherein like reference numerals refer to like parts throughout the several views, and wherein.

DETAILED DESCRIPTION OF EMBODIMENTS OF THE INVENTION

In the remote welding technique disclosed in Japanese Laid Open Patent Publication No. 2005-177862 described above, the moving speed of the laser irradiating device at the tip of the robotic arm acquired at the test-run differs from the moving speed of the laser irradiating during an actual operation for operating the robot at a manufacturing site.

That is, during the test-run, the moving speed of the laser irradiating device at the tip of the arm is set to be slower than that of the actual operation to check whether the laser irradiating device is properly operated without interfering with other robotic arms or peripheral devices. As such, for example, a moving speed of a point where a laser is irradiated (welding point speed) is slower during the test-run that that of the actual operation. Thus, energy is excessively applied at the welding point (oversupply of heat input amount) during the test-run. As a result, there is a problem in that a welding state for the actual operation cannot be accurately determined during the test-run.

In contrast, an apparatus and method are taught herein for performing laser welding operations to reproduce a welding state substantially identical to the actual operation of a robot at a manufacturing site. This can be achieved even when an operating speed of the robot is changed during a test-run in the course of preparing for manufacture.

Figure 1:
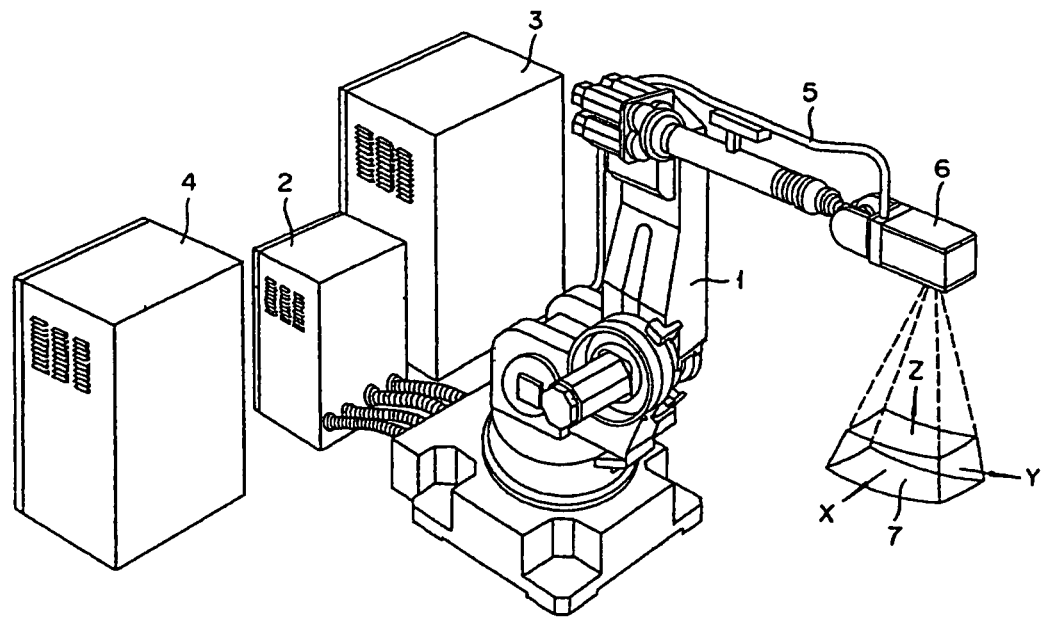
FIG. 1 is a schematic view illustrating a laser welding apparatus.

FIG. 1 is a schematic view illustrating a laser welding apparatus (i.e., a remote welding system; hereinafter simply referred to as a "system") is constructed in accordance with teachings of the invention. The system shown in FIG. 1 is configured to weld a work piece when it is distantly positioned away therefrom by using a laser without directly contacting a welding jig with the work piece. This is clearly different from conventional spot welding, etc., and is referred to as remote welding.

The system generally comprises a robot 1 and a robot controller 2 for controlling the robot 1. A scanner head 6 (i.e., laser irradiating device) irradiates a laser beam disposed at a tip of an arm of the robot 1, and an optical fiber cable 5 (i.e., light guiding device; hereinafter simply referred to as an "optical fiber") guides a laser beam from a laser oscillator 3 (a laser beam source) to the scanner head 6. A control unit 4 controls the scanner head 6 and the laser oscillator 3.

The control unit 4 is a computer that has, for example, a central processing unit, a memory unit, etc. For example, control unit 4 and other control units described herein can consist of a microcomputer including a central processing unit (CPU), input and output ports (I/O), random access memory (RAM), keep alive memory (KAM), a common data bus and read only memory (ROM) as an electronic storage medium for executable programs and certain stored values as discussed hereinafter. The functions could be, for example, implemented in software as the executable programs, or could be implemented in whole or in part by separate hardware in the form of one or more integrated circuits (IC).

As for the laser oscillator 3, a YAG laser oscillator is used to guide the laser beam through the optical fiber cable 5 by example.

The robot 1 is a general multi-axis robot (also known as a multi-articulated robot, etc.). The robot 1 can change the position of its arm and allows the tip of the arm (i.e., scanner head 6) to move in various directions according to the data of a motion path provided by an instruction. A moving range of a laser irradiation is indicated by reference numeral 7.

Figure 2:
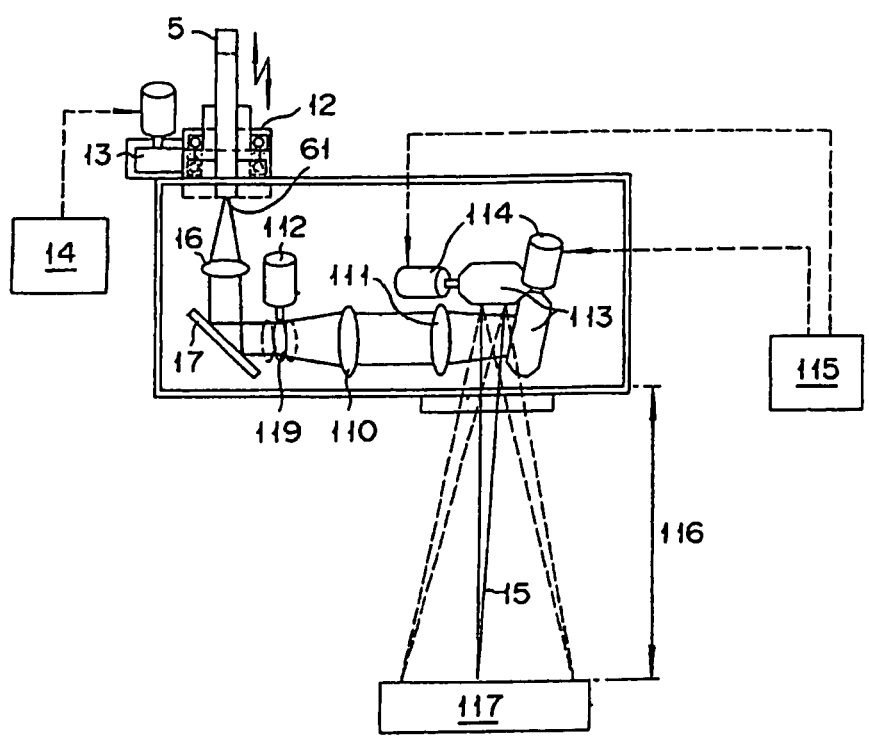
FIG. 2 is a diagram illustrating an inner part of a scanner head.

FIG. 2 is a diagram illustrating an inner part of the scanner head 6. As shown in FIG. 2, the inner part of the scanner head 6 comprises an optical fiber 5, an optical fiber retaining portion 12 for retaining the optical fiber, a fiber position changing mechanism 13 and a fiber actuator control unit 14. The inner part of the scanner head 6 also includes a collimate lens 16, a fixed mirror 17, a condensing distance varying lens 119, a first lens 110, a second lens 111, a condensing distance varying lens actuator 112, a laser scanning mirror 113 (i.e., reflecting device or reflecting mirror), a mirror actuator 114 and a mirror control unit 115.

A laser beam is indicated by reference numeral 15. The laser beam 15 passes through the collimate lens 16 to the fixed lens 17, then passes through the condensing distance varying lens 119, the first lens 110 and the second condensing lens 111. The laser beam 15 is then reflected and emitted by the laser scanning mirror 113.

The laser scanning mirror 113 rotatably moves via the mirror actuator 114. The mirror control unit 115 operates the mirror actuator 114 based on pre-instructed focus speed data. The mirror control unit 115 calculates a rotating angular velocity of the laser scanning mirror 113 to obtain a focus speed from the focus speed data. Further, the mirror control unit 115 controls the laser scanning mirror 113 such that the focus speed becomes an instructed (or commanded) focus speed.

As such, in the laser welding apparatus, it is possible to irradiate the laser in various directions through motion of a robot comprising the scanner head 6 as well as through motion of the laser scanning mirror 113.

Further, the fiber actuator control unit 14 controls the fiber position changing mechanism 13 depending on a distance 116 from the scanner head 6 to a work piece 117 in a welding path. The fiber actuator control unit 14 then changes a position of a laser emitting end 61 of the optical fiber 5 to adjust a focus position of the laser beam in the welding path. The fiber position changing mechanism 13 is fixed in position during a welding operation. However, a laser irradiating distance 116 from the scanner head 6 to the work piece 117 may be substantially changed due to the change in an installing position of the laser welding apparatus or the work piece. In such a case, the fiber position changing mechanism 13 can be adjusted to perform a laser focus adjustment.

A laser irradiating range by the scanner head 6 becomes a three-dimensional range as indicated by the reference numeral 7 in FIG. 1. That is, a position in the X-Y directions thereof can be changed by the laser scanning mirror 113. Further, a position in the Z direction can be changed by a position change of the condensing distance varying lens 119.

In laser welding, a moving speed (welding point speed) of a welding point of the laser beam irradiated to the work piece becomes a resultant speed of a focus moving speed of the laser beam through movement of the scanner head 6 by motion of the robot 1 and a focus moving speed of the laser beam by a rotation of the laser scanning mirror 113. In other words, the focus of the laser beam is changed by moving the scanner head 6 while rotating the laser scanning mirror 113. Thus, the moving speed of the welding point position of the laser beam irradiated to the work piece becomes a resultant speed of the focus moving speed of the laser beam by the movement of the scanner head 6 and the focus moving speed of the laser beam by the rotation of the laser scanning mirror 113 itself.

As mentioned above, a robot speed may be changed at a test-run in the course of preparing for manufacture. Thus, if a welding point speed at this time can become identical to a conventional welding point speed of the robot at a manufacturing site, then there would be no changes in the welding state.

The robot controller 2 stores an instructional data in advance and performs a welding operation by operating each axis of the robot 1 according to the instructional data.

The instructional data, for example, includes a motion path of the robot during the welding operation (i.e., a path for moving the scanner head 6), an operating speed of the robot while proceeding in the motion path, a focus moving speed of the laser beam corresponding to the motion path or operating speed of the robot, a rotating speed of the laser scanning mirror 113 for obtaining the focus moving speed, a position data of the condensing distance varying lens 119 for changing a focus corresponding to the laser irradiating position, welding conditions, etc.

The stored robot speed and the rotating speed of the laser scanning mirror 113 correspond to a speed when operating the robot at a manufacturing site. Further, the position data of the condensing distance varying lens 119 for changing the focus corresponding to the laser irradiating position corresponds to a motion path of the robot 1 and a rotating angle of the laser scanning mirror 113. As such, irrespective of the robot speed or the focus speed, the condensing distance varying lens 119 is instructed to be changed according to a current position of the robot 1 and a current rotating angle of the laser scanning mirror 113.

Further, the current position of the robot 1 and the current rotating angle of the laser scanning mirror 113 are obtained from a value of an encoder disposed therein. Also, in this embodiment, the position data of the condensing distance varying lens 119 may correspond to the motion path of the robot 1 and the rotating angle of the laser scanning mirror 113. However, when using a lens having an auto-focusing function, it is not necessary to correspond as mentioned above. Rather, it is possible to focus while measuring a distance between the scanner head 6 and the work piece 117 in a non-contact manner. Since auto-focusing is well known in conventional camera techniques, etc., its detailed description is omitted herein.

Also, the welding conditions include a welding point speed, a laser power, a laser irradiating start position and a laser irradiating finish position. The welding point speed is a resultant speed of the focus moving speed by a movement of the scanner head 6 and a focus moving speed of the laser beam by a rotation of the scanning mirror 113. The laser irradiating start position and the laser irradiating finish position correspond to a current position obtained from an encoder (not shown) of each axis of the robot 1 and a current rotating angle of the laser scanning mirror 113 obtained from an encoder (not shown) of the mirror actuator 114. As such, the laser irradiating position can be calculated in real time. A laser irradiation starts when reaching the laser irradiating start point and the laser irradiation finishes when reaching the laser irradiating finish point.

The mirror control unit 115 of the control unit 4 controls a rotating speed of the laser scanning mirror 113 within the scanner 6 and the laser power value at the time of an override of the robot operation (that is, changing a moving speed of the scanner head 6).

For example, an operating speed of the robot may become slower in an instruction playback operation than an actual operation. In such a case, the control unit 4 instructs the rotating speed of the laser scanning mirror 113 and the laser power value of the laser oscillator 3 to the scanner head 6 and the laser oscillator 3, respectively, depending on the override ratio (a moving speed change ratio).

The override ratio is set at 100% when the robot is actually operated. That is, a robot speed stored in the robot controller 2 has 100% of the override ratio. Here, the robot controller 2 can be generally operated depending on various robot speeds by changing the override ratio. For example, when the override ratio is 50%, the robot controller 2 operates at a speed that is half of the robot speed in an actual operation.

The control unit 4 obtains an override ratio instructed in the robot controller 2. The control unit 4 then instructs a rotating speed of the laser scanning mirror 113 and a laser power value of the laser oscillator 3 to the scanner head 6 and the laser oscillator 3, respectively, depending on the obtained override ratio.

Figure 3:
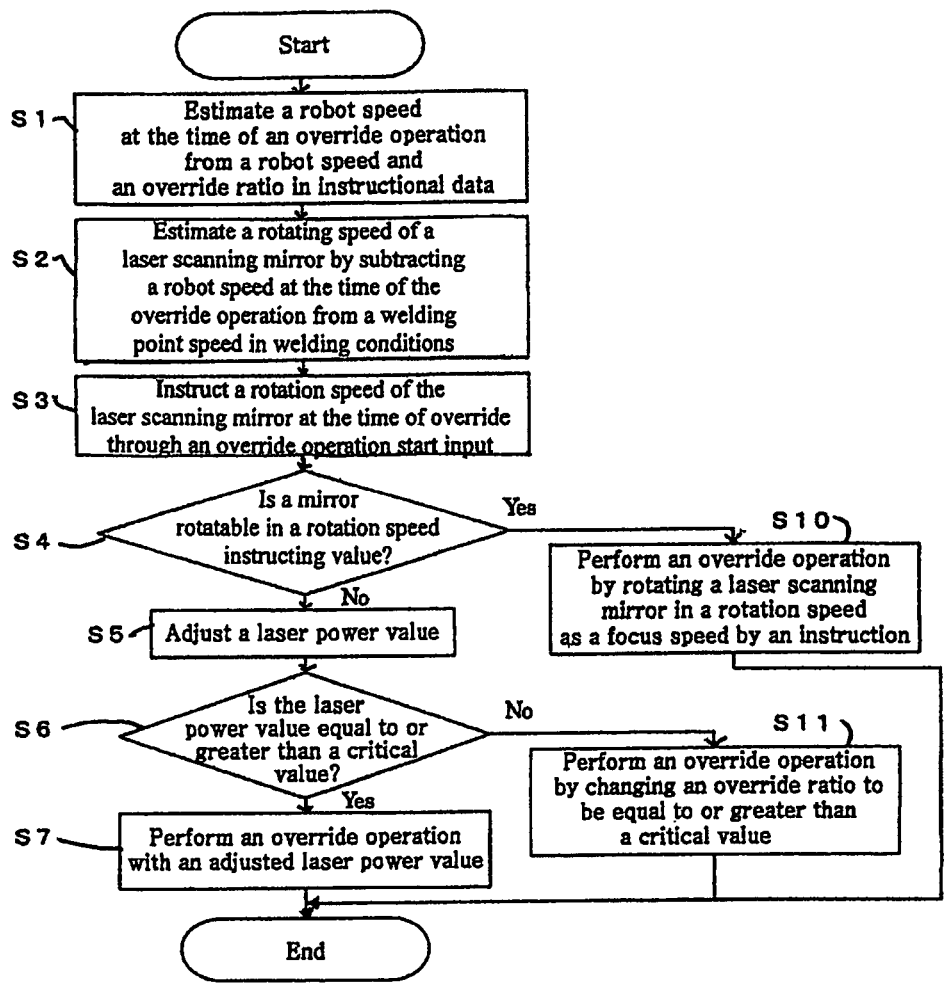
FIG. 3 is a flow chart illustrating processing sequences during an override operation (i.e., when a robot speed becomes slower)

FIG. 3 is a flow chart illustrating processing sequences at the time of an override operation (e.g., when a robot speed is set to be slow). First, the control unit 4 estimates a robot speed at the time of an override operation from a robot speed among the instructional data and the instructed override ratio at step S1. The instructional data is obtained from the robot controller 2, and an operator can input the override ratio into the robot controller 2.

Next, the control unit 4 subtracts the robot speed at the time of an override operation estimated in step S1 from the welding point speed in the welding conditions of the instructional data. This step S2 calculates a rotating speed of the laser scanning mirror 113 at the time of the override operation.

The control unit 4 receives an initiating instruction of the override operation and instructs the robot controller 2 to rotate the laser scanning mirror 113 at the calculated rotating speed in step S3. Of course, this motion is only an example. In other configurations, movement other than rotation of the laser scanning mirror 113 is possible. The robot controller 2 receives such an instruction and determines whether the laser scanning mirror 113 can be rotated at such a rotating speed at step S4. This process is explained below in detail.

If the mirror can be rotated in a rotating operation by an instruction in response to the query of step S4 (i.e., the answer to step S4 is Yes), then the robot controller 2 performs an override operation by an instructed override ratio while rotating the laser scanning mirror 113 at a rotating speed by an instruction from the control unit 4 at step S110.

As such, the welding point speed becomes a speed at an actual operation (i.e., predetermined speed), wherein the welding speed is a resultant speed of the focus moving speed of the laser beam by a movement of the robot (a scanner head) and the focus moving speed of the laser beam by a rotation of the laser scanning mirror.

Further, as in an actual operation, the laser irradiating position is calculated in real time. Also, laser irradiation starts when reaching the laser irradiating start point, and laser irradiation finishes when reaching the laser irradiating finish point during the override operation.

Figure 4:
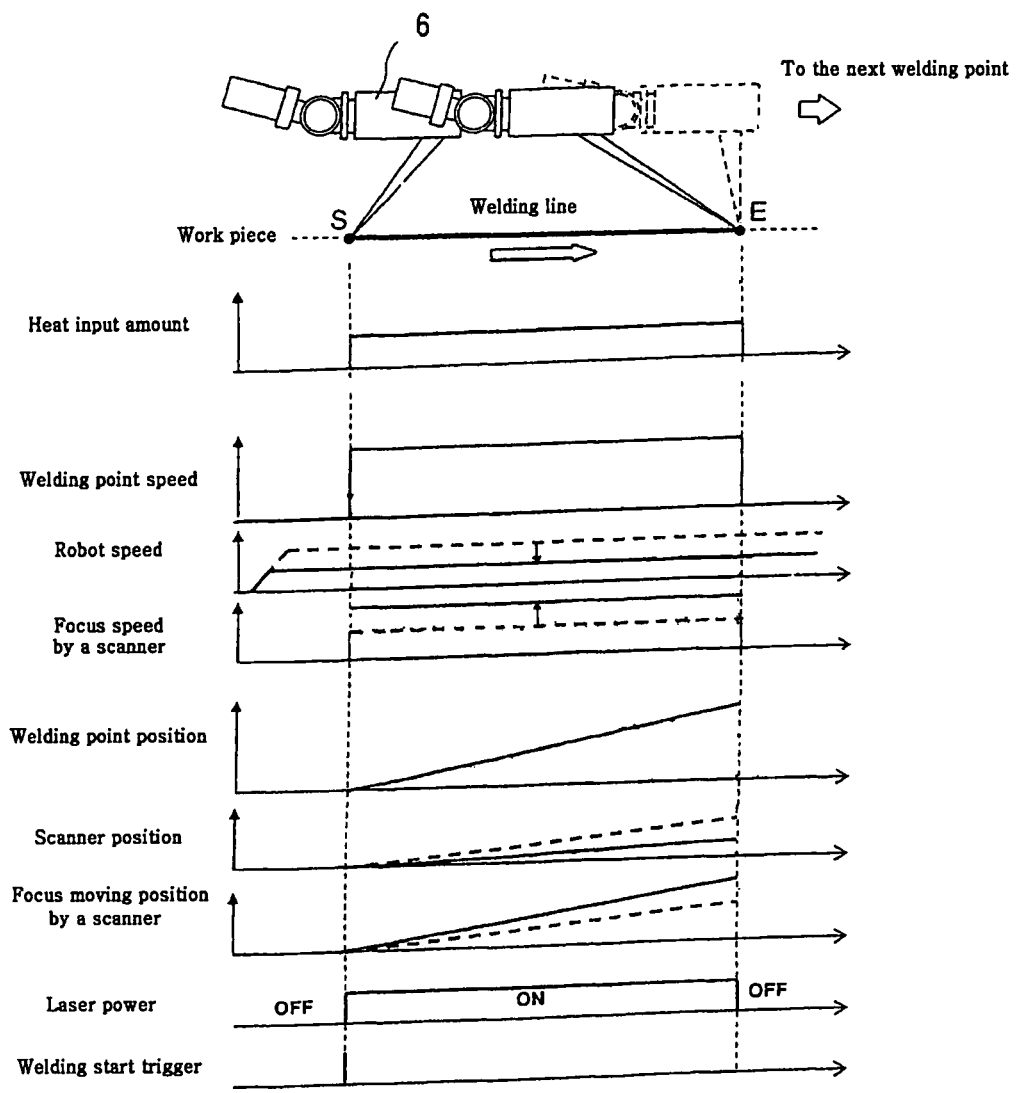
FIG. 4 is a time chart illustrating when an override operation is performed in accordance with embodiments of the invention.
Figure 5:
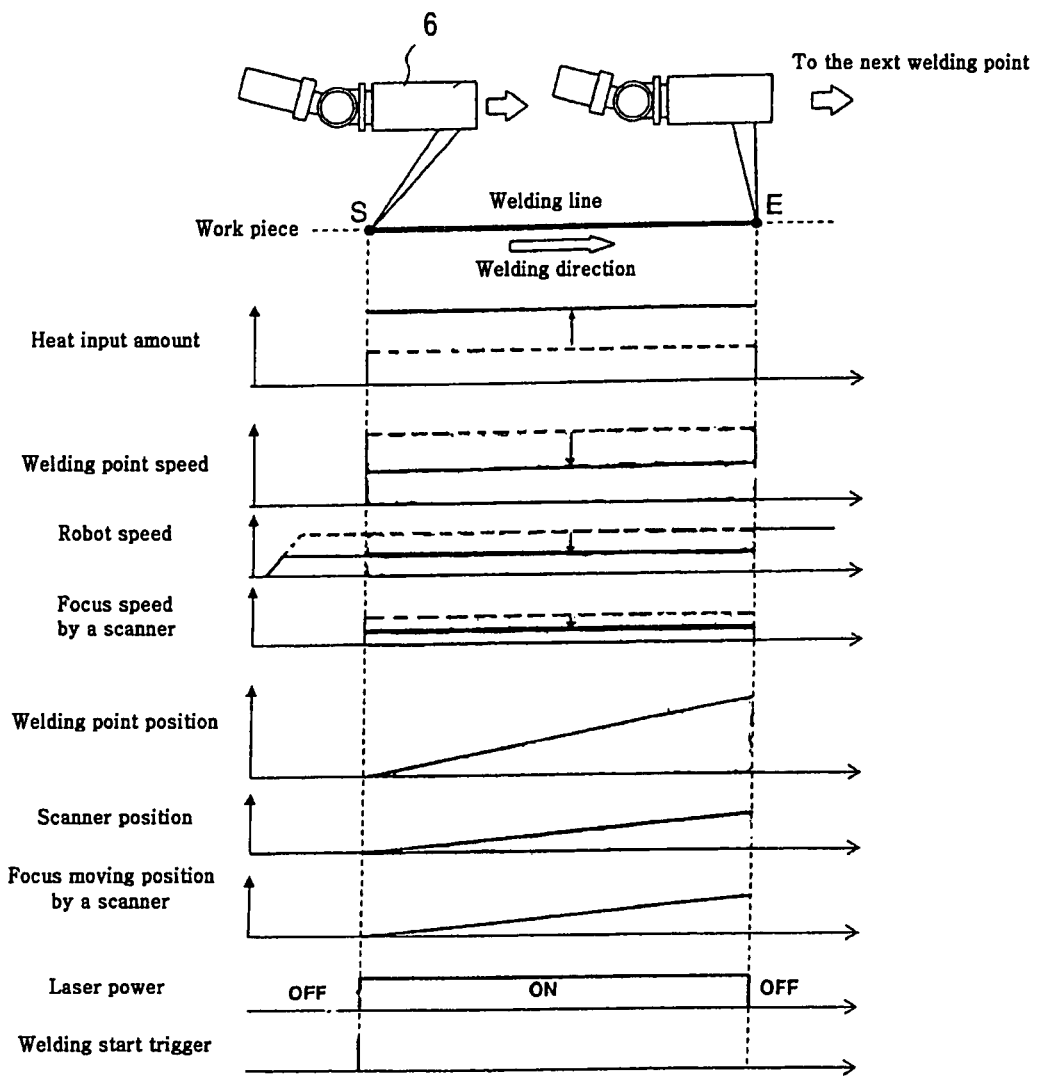
FIG. 5 is a time chart illustrating when a conventional override operation is performed as a comparative example.

FIGS. 4 and 5 illustrate the functions of this embodiment. FIG. 4 shows a time chart when an override operation is performed in accordance with this embodiment. FIG. 5 is a time chart when a conventional override operation is performed as a comparative example. In these time charts, the abscissa axis in each drawing indicates the time.

As shown in FIG. 4, in this embodiment, when the override ratio is 100% (dash line in the drawings), the robot speed is decreased (solid line in the drawings) if operated by an override instruction. However, according to the above, the focus moving speed by a rotation of the scanner increases. To this end, the welding point speed, which is a resultant speed of the focus moving speed by movement of the scanner head 6 and the focus moving speed by rotation of the laser scanning mirror 113, does not differ from that when the override ratio is 100%. Further, the heat input amount thereof does not change.

Therefore, by adopting this embodiment, a welding state that is the same as in an actual operation can be obtained, despite an override. By performing an override operation to slow down an operation of the robot 1, it can be determined whether there is a problem in the operation and whether the robot interferes with other objects.

Meanwhile, in a conventional method as shown in FIG. 5, when the override ratio is 100% (dash line in the drawings), the robot speed is decreased (solid line in the drawings) if operated by an override instruction. At this time, the focus moving speed by the scanner is also decreased by the override instruction. To this end, the welding point speed, which is a resultant speed of the robot moving speed and the focus moving speed by rotation of the laser scanning mirror, becomes slower than that when the override ratio is 100% (changed from the dash line position to the solid line position in the drawings). If so, since the welding point speed slows down, a heat input amount at this time becomes higher than that in an actual operation (changed from the dash line position to the solid line position in the drawings).

Therefore, when the robot slows down during an override as in the conventional method, more heat is required than in an actual operation such that a welding state becomes different from that in the actual operation. Although a movement of the robot can be checked, a welding state corresponding to such a movement cannot be checked.

Next, an adjustment of the laser power is explained. In step S4 discussed above, it is decided whether or not the laser scanning mirror 113 can be rotated at a rotating speed through an instruction. Such a step makes the welding point speed to be identical as in an actual operation by increasing the rotating speed of the laser scanning mirror 113. However, a heat input amount cannot become the same only by increasing the rotating speed of the laser scanning mirror 113 depending on the input override ratio.

For example, when an override ratio is small, a welding point speed does not reach a speed in an actual operation, despite rotating the laser scanning mirror 113 at a maximum speed. To this end, whether or not the laser scanning mirror 113 is rotatable in step S4 is determined by considering whether or not an instructed rotating speed of the laser scanning mirror 113 exceeds a maximum of the rotating speed.

Also, when the rotating speed exceeds a rotatable maximum speed of the laser scanning mirror 113 (i.e., the response to step S4 is No) this means that a resultant speed of the focus moving speed of the laser beam by a robot movement and the focus position moving speed of the laser beam by a movement of the laser scanning mirror 113 is equal to or less than a predetermined lower limit speed, and the rotating speed of the laser scanning mirror 113 is controlled. In addition, a laser power value of the laser oscillator 3 is also further adjusted as described in next step S5. Moreover, in case of a "No" response in step S4, a signal for transmitting a negative response is delivered from the robot controller 2 to the control unit 4.

As for adjusting the laser power value, data on an output suitable for the welding point speed is prepared in advance. Then, such data is used in the control unit 4. Also, the control unit 4 determines whether the adjusted laser power value is equal to or greater than a predetermined critical value in step S6 as explained below). Then, when the adjusted laser power value is equal to or greater than a predetermined critical value, the laser power value is instructed to the laser oscillator. Further, the robot controller 2 is instructed to perform an override operation by an instructed override ratio in step S7.

Figure 6:
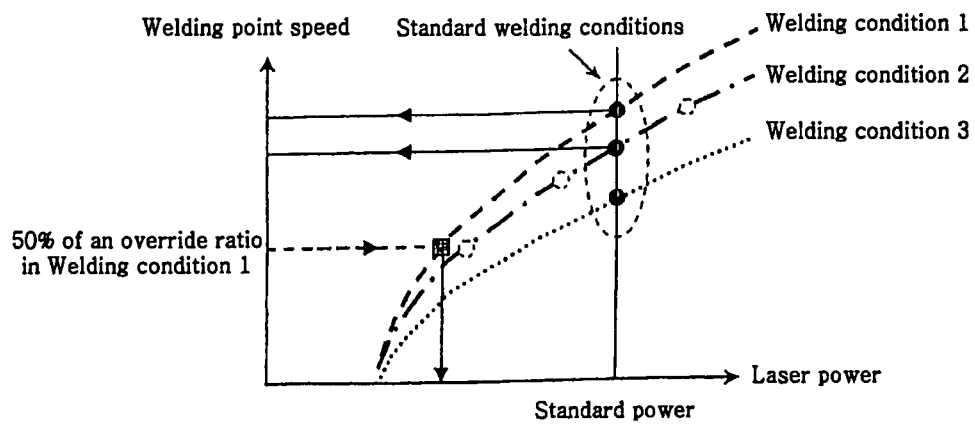
FIG. 6 is a graph showing a laser power value causing a welding point speed change to be the same as a heat input amount during an actual operation.

FIG. 6 is a graph showing a laser power value that causes a welding point speed change to be the same as a heat input amount during an actual operation. From the graph shown in FIG. 6, when a laser power value in a heat input amount at an actual operation is a standard power, a laser power value for causing the heat input amount to be the same as the heat input amount at an actual operation can be obtained by decreasing a welding point speed.

Figure 7:
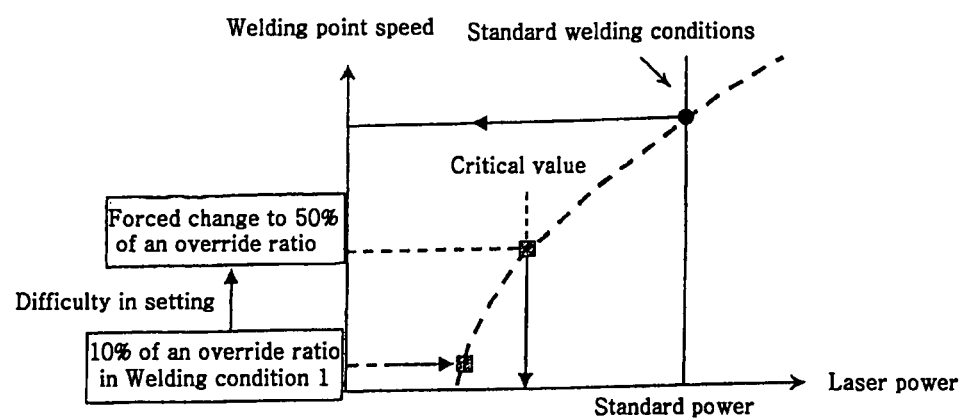
FIG. 7 is a graph showing a laser power value relating to a welding speed for explaining an override ratio change.

Further, FIG. 6 shows three different welding conditions by way of examples. A table corresponding to the laser power value for the welding point as in the above graph is stored in the control unit 4. The rotating speed may not reach a predetermined speed (a welding point speed at an actual operation) even if the control unit 4 increases a rotating speed of the laser scanning mirror 113 depending on the override ratio. In such a case, the control unit 4 further adjusts a laser power value to become a heat input amount necessary for the welding point speed with reference to the corresponding table as shown in the graph of FIG. 7.

As such, even if an override ratio is small, a heat input amount equal to that of an actual operation can be maintained. To this end, it is possible to check whether a welding state is the same as that of an actual operation. It is also possible to check an operation of the robot itself by a slow movement.

Next, the changes of the override ratio will be further explained. In step S6 as discussed above, it is determined whether an adjusted laser power value is equal to or greater than a predetermined critical value. This is because if a laser power value is excessively small, there is a concern that no matter how slow the welding point speed is the laser power would be lacking for performing suitable welding.

Thus, according to a described embodiment, when the laser power is incapable of welding and is additionally decreased (i.e., the response to the query of step S6 is No), the control unit 4 further adjusts an instructed override ratio in step S11.

FIG. 7 is a graph showing a laser power value related to a welding speed that explains an override ratio change. As shown in FIG. 7, for example, when the override ratio is low (e.g., 10%), the laser power value is accordingly decreased. However, since such laser power is incapable of welding, the instructed override ratio is increased up to 50%. Further, such an instruction is transmitted from the control unit 4 to the robot controller 2.

Here, a laser power that is incapable of welding is set as a critical value in advance. The control unit 4 may decrease the laser power value according to the welding point speed as above. In this case, if such a value is less than the critical value, then the control unit changes the override ratio to be equal to or greater than the critical value and instructs it to the robot controller 2. As such, without decreasing the laser power than what is absolutely necessary, a welding state that is the same as an actual operation can be obtained.

While certain embodiments of the invention are described above, it should be understood that the invention is not limited to those embodiments. For example, herein a focus moving speed by the laser scanning mirror 113 at the time of an override is calculated for throughout the entire motion path to be overridden. Alternatively, it can be calculated in real time from a robot speed during an override operation.

Further, while a motion path is shown as a straight line in the drawings illustrating the embodiments, the path is not limited to the straight line. Alternatively, the motion path may be applied to various configurations such as an arc.

Also, an irradiating direction of the laser beam can be changed by using a prism instead of the reflecting mirror.

The invention can be used for laser welding and manufacturing, for example.

Accordingly, the above-described embodiments have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A laser welding apparatus for performing welding by irradiating a laser beam, the apparatus comprising:
    a laser oscillator operable to generate a laser beam;
    a laser irradiating device having a reflecting device configured to change an irradiating direction of the laser beam guided from the laser oscillator at a first focus moving speed;
    a moving device operable to move the laser irradiating device at a second focus moving speed, such that a resultant welding point speed of the laser beam is determined by the first focus moving speed and the second focus moving speed; and
    a control unit operable to store programmed values of the first focus moving speed and the second focus moving speed corresponding a desired resultant welding point speed, wherein when the second focus moving speed is changed from a programmed value speed to an override value, the control unit is arranged to control the first focus moving speed away from a programmed value such that the welding point speed becomes closer to the desired resultant welding point speed.

2. The apparatus according to claim 1 wherein the reflecting device is a reflecting mirror.

3. The apparatus according to claim 1 wherein the control unit is further operable to:
change a laser power value of the laser oscillator to a non-zero value when the resultant welding point speed becomes less than or equal to a predetermined lower limit speed.

4. The apparatus according to claim 3 wherein the control unit is operable to change the laser power value of the laser oscillator by reducing the laser power value of the laser oscillator as the resultant welding point speed is reduced.

5. The apparatus according to claim 4 wherein the control unit is operable to increase the second focus moving speed of the moving device when a projected laser power value is less than a predetermined lower limit.

6. The apparatus according to claim 1 wherein the reflecting device is configured to rotate to change the irradiating direction of the laser beam guided from the laser oscillator.

7. A laser welding apparatus for performing welding by irradiating a laser beam, the apparatus comprising:
a laser oscillator operable to generate a laser beam;
a laser irradiating device having a reflecting device configured to change an irradiating direction of the laser beam guided from the laser oscillator;
a moving device operable to move the laser irradiating device; and
a control unit operable to control a movement speed of the reflecting device at a stored predetermined speed based on a stored predetermined movement speed of the laser irradiating device,
wherein when the movement speed of the moving device is changed from the stored predetermined moving speed, the control unit is arranged to control the movement speed of the reflecting device such that a resultant moving speed of a laser focus based on the movement of the laser irradiating device and the movement of the reflecting device is equal to a predetermined speed.

8. A method of performing laser welding using a laser irradiating device having a reflecting mirror movable to change an irradiating direction of a laser beam, the method comprising:
providing a program for a laser welding operation in which the laser irradiating device moves at a programmed operating speed and the reflecting mirror moves at a corresponding programmed movement speed to cause a focus of the laser beam to move in a programmed path at a programmed welding point speed;
generating the laser beam;
moving the laser irradiating device at an operating speed that deviates from the programmed operating speed while moving the focus of the laser beam in the programmed path; and
controlling the movement speed of the reflecting mirror such that a resultant speed of the focus of the laser beam equals the programmed welding point speed.

9. The method according to claim 8, further comprising:
changing a laser power value of the laser beam to a non-zero value when the resultant speed becomes equal to or less than a predetermined lower limit speed.

10. The method according to claim 9, further comprising:
increasing the operating speed when the laser power value becomes equal to or lower than a predetermined lower limit according to the change of the laser power value.

11. The method according to claim 8 wherein controlling the reflecting mirror includes:
calculating a rotating angular velocity of the reflecting mirror to obtain the movement speed of the reflecting mirror using the programmed welding point speed.

12. The method according to claim 11, further comprising:
changing a distance of the laser irradiating device relative to a weld point by changing a position of a condensing distance varying lens located in the laser irradiating device.

13. The method according to claim 12, further comprising:
corresponding position data of the condensing distance varying lens to a motion path of a moving device and a rotating angle of the reflecting mirror.

14. The method according to claim 8, further comprising:
starting a laser irradiation at a laser irradiating start point; and
terminating the laser irradiation when reaching a laser irradiating finish point.

15. The method according to claim 8, further comprising:
instructing a rotating speed of the reflecting mirror and the laser power of the laser oscillator depending on an override ratio.

16. The method according to claim 15, further comprising:
obtaining the override ratio externally.

17. The method according to claim 16, further comprising:
determining whether the reflecting mirror can be rotated at the rotating speed.

18. The method according to claim 17, further comprising:
adjusting the laser power value if the rotating speed exceeds a rotatable maximum speed of the reflecting mirror.

19. The method according to claim 18, further comprising:
determining whether the adjusted laser power value is less than a predetermined critical value.

20. The method according to claim 19, further comprising:
changing the override ratio to be equal to or greater than the predetermined critical value if the adjusted laser power value is less than the predetermined critical value.

21. The method according to claim 18, further comprising:
performing an override operation with an adjusted laser power value if the adjusted power value is greater than or equal to the predetermined critical value.

* * * * *